(12) United States Patent
Grizante Redondo et al.

(10) Patent No.: US 8,901,426 B2
(45) Date of Patent: Dec. 2, 2014

(54) FLAME-RETARDANT ELECTRICAL CABLE

(75) Inventors: Eduardo Grizante Redondo, Milan (IT); Frank Luebbe, Milan (IT)

(73) Assignee: Prysmian S.p.A., Milan (IT)

(*) Notice: Subject to any disclaimer, the term of this patent is extended or adjusted under 35 U.S.C. 154(b) by 90 days.

(21) Appl. No.: 13/057,424

(22) PCT Filed: Aug. 5, 2008

(86) PCT No.: PCT/IB2008/002055
§ 371 (c)(1),
(2), (4) Date: Apr. 29, 2011

(87) PCT Pub. No.: WO2010/015876
PCT Pub. Date: Feb. 11, 2010

(65) Prior Publication Data
US 2011/0240335 A1    Oct. 6, 2011

(51) Int. Cl.
*H01B 7/00* (2006.01)
*B01F 17/00* (2006.01)
*C08L 23/08* (2006.01)
*H01B 3/44* (2006.01)
*C08L 23/04* (2006.01)
*H01B 7/295* (2006.01)
*C08L 23/10* (2006.01)
*C08K 3/00* (2006.01)
*C08L 23/06* (2006.01)

(52) U.S. Cl.
CPC .............. *C08L 23/04* (2013.01); *C08L 23/0815* (2013.01); *H01B 3/441* (2013.01); *C08L 2201/02* (2013.01); *C08L 23/10* (2013.01); *C08K 3/0058* (2013.01); *H01B 7/295* (2013.01); *C08L 23/06* (2013.01)
USPC ................... 174/121 A; 174/116; 174/113 R; 524/528

(58) Field of Classification Search
USPC ................... 174/113 R, 116, 121 A; 524/528
See application file for complete search history.

(56) References Cited

U.S. PATENT DOCUMENTS 4,145,404 A    3/1979    Miyata et al.
4,317,765 A    3/1982    Gaylord
(Continued)

FOREIGN PATENT DOCUMENTS

EP    0 328 051 A1    8/1989
EP    0 416 815 A2    3/1991
(Continued)

OTHER PUBLICATIONS

"Standard Test Method for Flow Rates of Thermoplastics by Extrusion Plastometer", ASTM Designation; D-1238-90b, American National Standard, pp. 393-401, 1990.

(Continued)

*Primary Examiner* — William H Mayo, III
*Assistant Examiner* — Rhadames J Alonzo Miller
(74) *Attorney, Agent, or Firm* — Finnegan, Henderson, Farabow, Garrett & Dunner, L.L.P.

(57) ABSTRACT

A flame-retardant cable includes at least one conductor and at least one coating made from a flame-retardant composition. The flame-retardant composition includes: (a) at least one crystalline propylene homopolymer or copolymer; (b) at least one copolymer of ethylene with at least one $C_3$-$C_{12}$ alpha-olefin, having a density of from 0.860 to 0.904 g/cm$^3$ and a Molecular Weight Distribution Index not higher than 5; (c) at least one ethylene homopolymer or copolymer of ethylene with at least one $C_3$-$C_{12}$ alpha-olefin having a density of from 0.905 to 0.970 g/cm$^3$; and (d) at least one flame-retardant filler.

17 Claims, 2 Drawing Sheets

(56) References Cited

U.S. PATENT DOCUMENTS

| | | | |
|---|---|---|---|
| 4,673,620 A | 6/1987 | Shulman et al. | |
| 5,008,204 A | 4/1991 | Stehling | |
| 5,229,478 A | 7/1993 | Floyd et al. | |
| 5,246,783 A | 9/1993 | Spenadel et al. | |
| 5,272,236 A | 12/1993 | Lai et al. | |
| 5,414,040 A | 5/1995 | McKay et al. | |
| 5,703,187 A | 12/1997 | Timmers | |
| 5,707,732 A | 1/1998 | Sonoda et al. | |
| 5,770,820 A * | 6/1998 | Nelson et al. | 174/113 R |
| 6,384,143 B1 | 5/2002 | Nishihara et al. | |
| 6,495,760 B1 * | 12/2002 | Castellani et al. | 174/110 R |
| 6,552,112 B1 * | 4/2003 | Redondo et al. | 524/436 |
| 6,924,031 B2 * | 8/2005 | Grizante Redondo et al. | 428/372 |
| 7,518,064 B2 * | 4/2009 | Morioka et al. | 174/120 R |
| 7,709,740 B2 * | 5/2010 | Reyes | 174/110 R |
| 7,713,620 B2 * | 5/2010 | Hase | 428/379 |
| 7,759,580 B2 * | 7/2010 | Park et al. | 174/121 A |
| 2003/0059613 A1 * | 3/2003 | Tirelli et al. | 428/375 |
| 2003/0178220 A1 * | 9/2003 | Barusseau et al. | 174/110 PM |
| 2005/0137306 A1 * | 6/2005 | Hausmann et al. | 524/416 |
| 2005/0192392 A1 * | 9/2005 | Kim et al. | 524/436 |
| 2005/0222314 A1 * | 10/2005 | Credali et al. | 524/423 |
| 2006/0207785 A1 * | 9/2006 | Jow et al. | 174/110 R |
| 2007/0027250 A1 * | 2/2007 | Joseph et al. | 524/515 |

FOREIGN PATENT DOCUMENTS

| | | |
|---|---|---|
| EP | 0 418 044 A2 | 3/1991 |
| EP | 0 530 940 A1 | 3/1993 |
| EP | 0 632 065 A1 | 1/1995 |
| EP | 0 889 091 A1 | 1/1999 |
| WO | WO-93/19107 | 9/1993 |
| WO | WO-99/05688 | 2/1999 |
| WO | WO-00/19452 | 4/2000 |
| WO | WO-00/39810 | 7/2000 |

OTHER PUBLICATIONS

"Test on Electronic and Optical Fibre Cables Under Fire Conditions", International Standard. International Electrotechnical Commission (IEC), 60332-1-2, pp. 1-21.

Wild et al.; "Determination of Branching Distributions in Polyethylene and Ethylene Copolymers", Journal of Polymer Science: Polymer Physics Edition, vol. 20, pp. 441-455, 1982.

Möhring et al.; "Homogeneous Group 4 metallocene Zieglet-Natta catalysts: the influences of cyclopentadienyl-ring substituents", Journal of Organometallic Chemistry, 479, pp. 1-29, 1994.

CEI EN 60811-1-1, "Insulating and sheathing materials of electric cables" Part 1: General application, Section 1: Measurement of thickness and overall dimension Test for determining the mechanical properties, 29 pages, 2001.

CEI EN 50265-2-1, "Common test methods for cables under fire conditions—Test for resistance to vertical flame propagation for a single insulated conductor of cable" Part 2-1: Procedures—1 kW pre-mixed flame 13 pages, 1999.

CEI EN 60811-3-1, "Insulation and sheathing materials of electric cables", Part 3 Methods specific to PVC compounds, Section 1: Pressure test at high temperature—Tests for resistance to cracking, 21 page, 2001.

International Search Report from the European Patent Office for International Application No. PCT/IB2008/002055, (Mail date Apr. 14, 2009).

* cited by examiner

FLAME-RETARDANT ELECTRICAL CABLE

CROSS REFERENCE TO RELATED APPLICATION

This application is a national phase application based on PCT/IB2008/002055, filed Aug, 5, 2008, the content of which is incorporated herein by reference.

BACKGROUND OF THE INVENTION

1. Field of the Invention

The present invention relates to flame-retardant electrical cables, in particular for low-voltage power transmission or for telecommunications. Also, the invention relates to flame-retardant compositions, suitable for producing said cables.

2. Description of the Related Art

Flame-retardant cables are generally produced by extruding over the core of the cable a flame-retardant coating consisting of a polymer composition which has been given flame-retardant properties by the addition of a suitable additive. Polyolefin-based compositions based, for example, on polyethylene or ethylene/vinyl acetate copolymers, containing an organic halide combined with antimony trioxide as flame-retardant additive can, for example, be used for this purpose. However, halogenated flame-retardant additives have many drawbacks, since they partially decompose during processing of the polymer, giving rise to halogenated fumes that are toxic and corrode the metal parts of the polymer-processing equipment. In addition, when they are placed directly in a flame, their combustion gives rise to very large amounts of fumes containing toxic substances. Similar drawbacks are encountered when polyvinyl chloride (PVC) with added antimony trioxide is used as base polymer.

In recent years, use has been made of halogen-free compositions in the production of flame-retardant cables, in which a polymer base, generally made from at least one polyolefin, is mixed with inorganic flame-retardant fillers, generally hydroxides, hydrated oxides or hydrated salts of metals, in particular of aluminium or magnesium, such as magnesium hydroxide or alumina trihydrate, or mixtures thereof (see, for example, U.S. Pat. Nos. 4,145,404, 4,673, 620, EP 328,051 and EP 530,940).

However, the use of inorganic flame-retardant fillers, such as magnesium hydroxide or alumina trihydrate, does have certain drawbacks. Particularly, to impart effective flame-retardant properties, large amounts of the inorganic filler should be added to the polymer material, e.g. for magnesium hydroxide generally about 120-250 parts by weight relative to 100 parts by weight of the polymer material. Such high levels of filler lead to a reduction in processability and in mechanical and elastic properties of the resulting mixture, in particular as regards impact resistance, elongation and stress at break.

In U.S. Pat. No. 5,707,732 an electrical or telecommunications cable is disclosed, which is coated with a flame-retardant composition comprising 100 parts by weight of a resin mixture and from 5 to 250 parts by weight of a flame-retardant filler. The filler is either magnesium hydroxide or aluminium trihydrate, while the resin mixture consists of: (i) a polyethylene made using a metallocene single-site catalyst system and having an $M_w/M_n$ ratio not greater than about 3; (ii) a polyethylene made using a transition metal catalyst other than a metallocene single-site catalyst system and having an $M_w/M_n$ ratio greater than about 4; and optionally (iii) a copolymer of ethylene and an unsaturated ester or a very low density polyethylene having a density not greater than 0.915 g/cm3; wherein resins (i) or (ii) are modified with an unsaturated aliphatic bi-acid anhydride through grafting or copolymerization.

International Patent Application WO 99/05688 discloses low-smoke self-extinguishing cables, which are coated with a flame-retardant composition comprising natural magnesium hydroxide as flame-retardant filler and, as polymeric components: (a) a crystalline propylene homopolymer or copolymer; and (b) a copolymer of ethylene with at least one alpha-olefin having from 3 to 12 carbon atoms, and optionally with a diene, said copolymer being characterized by a composition distribution index greater than 45%, said index being defined as the weight percentage of copolymer molecules having an alpha-olefin content within 50% of the average total molar content of alpha-olefin. The copolymers (b) can be obtained by copolymerization of ethylene with at least one alpha-olefin, and optionally with a diene, in the presence of a single-site catalyst, particularly a metallocene catalyst or a constrained geometry catalyst. These compositions allow producing cables which combine a high flame-resistance with good mechanical properties. Particularly, the ethylene/alpha-olefin copolymer as defined above improves incorporation and dispersion of the mineral filler into the polymer matrix, while the presence of crystalline propylene homopolymers or copolymers enhances thermocompression resistance of the cable.

International Patent Application WO 00/19452 discloses low-smoke self-extinguishing cables, which are coated with a flame-retardant composition comprising: (a) an ethylene homopolymer or copolymer having a density of from 0.905 to 0.970 g/cm$^3$, and being selected from: ethylene homopolymers; copolymers of ethylene with an alpha-olefin; copolymers of ethylene with an ethylenically unsaturated ester; or mixtures thereof; (b) a copolymer of ethylene with an alpha-olefin, and optionally with a diene, said copolymer (b) having a density of from 0.860 to 0.904 g/cm$^3$, and being characterized by a composition distribution index greater than 45%; (c) natural magnesium hydroxide in an amount such as to impart flame-retardant properties; wherein at least one of the polymeric components (a) and (b) contains hydrolysable organic silane groups grafted onto the polymer chain.

U.S. Pat. No. 6,384,143 relates to a rubber composition which contains a thermoplastic partially or completely crosslinked product comprising 1-99 parts by weight of an ethylene-α-olefin copolymer (A) containing an ethylene unit and an α-olefin unit of 3-20 carbon atoms and prepared using a metallocene catalyst and 1-99 parts by weight of an olefin resin (B)(the total amount of (A) and (B) being 100 parts by weight), the crosslinking degree of the ethylene-α-olefin copolymer (A) being 50% or higher, and 1-500 parts by weight of a thermoplastic elastomer (C) added later to the crosslinked product. The olefin resin (B) can be an ethylene resin or a propylene resin. The propylene resins usable most suitably in the above invention include, for example, isotactic polypropylene homopolymers and isotactic copolymer resins. The thermoplastic elastomer (C) may be selected from, inter alia, ethylene-propylene rubbers, ethylene-propylene-diene monomer terpolymer rubbers (EPDM) and ethylene-octene-copolymer rubbers. The composition can be produced through a method which comprises subjecting the copolymer rubber (A) and the olefin resin (B) to dynamic crosslinking, then adding the thermoplastic elastomer (C) at the latter stage of the same extruder, melt kneading them, and then removing the composition from the extruder. The composition may contain, inter alia, inorganic fillers and flame retardant additives. The compositions can be used for a wide variety of uses, including, inter alia, cables.

SUMMARY OF THE INVENTION

The Applicant faced the problem of providing flame-retardant cables having increased maximum operating temperature (up to 90° C.) by improving resistance to thermo-pressure by using a flame-retardant composition having good processability and suitable mechanical properties, particularly in terms of elongation at break. In an attempt to solve the above problem, the Applicant tried to improve thermo-pressure resistance of the flame-retardant cables disclosed in the above cited WO 99/05688 by increasing the amount of the crystalline propylene homopolymer or copolymer. However, the Applicant observed that the resulting flame-retardant covering showed an unacceptable decrease of elongation at break, especially after thermal ageing.

Moreover, the Applicant observed that the flame-retardant compositions as disclosed in the above cited patent application WO 00/19452, although providing very good mechanical properties and flexibility even when large amounts of flame-retardant filler are used, show some drawbacks in terms of processability. In fact, the above flame-retardant compositions should be extruded at low rates to avoid occurrence of defects in the cable sheathing with consequent impairment of mechanical properties and surface appearance. Consequently productivity of extrusion plant is reduced.

The Applicant found that the above problems can be solved by providing the cable with at least one flame-retardant coating comprising at least one inorganic flame-retardant filler and, as polymeric base, a mixture of: at least one crystalline propylene homopolymer or copolymer; at least one copolymer of ethylene with at least one $C_3$-$C_{12}$ alpha-olefin, having a density of from 0.860 to 0.904 g/cm$^3$ and a Molecular Weight Distribution Index (MWDI) not higher than 5; at least one ethylene homopolymer or copolymer of ethylene with at least one $C_3$-$C_{12}$ alpha-olefin having a density of from 0.905 to 0.970 g/cm$^3$.

The above coating imparts excellent flame-retardant properties to the cable, with a remarkable increase of thermo-pressure resistance without decreasing processability and mechanical properties, particularly in terms of elongation at break and elongation at break after thermal ageing.

Moreover, the Applicant found that the above flame-retardant coating surprisingly reduces water absorption when the cable is exposed to a humid environment. As will be shown in the following, the flame-retardant compositions of the invention absorb water in percentages dramatically lower than those absorbed by polymeric compositions nowadays used for sheathing electrical cables to be employed in humid environment. Thus, cables sheathed with the composition of the invention are suitable for underground installations.

Therefore, according to a first aspect, the present invention relates to a flame-retardant cable comprising at least one conductor and at least one coating made from a flame-retardant composition, wherein said flame-retardant composition comprises:

(a) at least one crystalline propylene homopolymer or copolymer;

(b) at least one copolymer of ethylene with at least one $C_3$-$C_{12}$ alpha-olefin, having a density of from 0.860 to 0.904 g/cm$^3$ and a Molecular Weight Distribution Index (MWDI) not higher than 5;

(c) at least one ethylene homopolymer or copolymer of ethylene with at least one $C_3$-$C_{12}$ alpha-olefin having a density of from 0.905 to 0.970 g/cm$^3$;

(d) at least one flame-retardant filler.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to the present description and claims, as "flame retardant" is meant a cable provided with a material having the capacity of delaying the flame propagation according to IEC 60332-1-2 (2004).

According to another aspect, the present invention relates to a flame-retardant composition comprising:

(a) at least one crystalline propylene homopolymer or copolymer;

(b) at least one copolymer of ethylene with at least one $C_3$-$C_{12}$ alpha-olefin, having a density of from 0.860 to 0.904 g/cm$^3$ and a Molecular Weight Distribution Index (MWDI) not higher than 5;

(c) at least one ethylene homopolymer or copolymer of ethylene with at least one $C_3$-$C_{12}$ alpha-olefin having a density of from 0.905 to 0.970 g/cm$^3$;

(d) at least one flame-retardant filler.

According to a preferred embodiment, the flame retardant composition comprises: from 5 to 25% of the at least one crystalline propylene homopolymer or copolymer (a); from 50 to 90% by weight of the at least one copolymer of ethylene (b); from 5 to 30% by weight of at least one ethylene homopolymer or copolymer (c); the percentages being referred to the total weight of the polymeric components (a), (b) and (c).

More preferably, the flame retardant composition comprises: from 10 to 20% of the at least one crystalline propylene homopolymer or copolymer (a); from 65 to 80% by weight of the at least one copolymer of ethylene (b); from 10 to 20% by weight of at least one ethylene homopolymer or copolymer (c); the percentages being referred to the total weight of the polymeric components (a), (b) and (c).

According to a preferred embodiment, the at least one flame-retardant filler is present in an amount of from 80 to 300%, more preferably from 120 to 250%, the percentages being referred to the total weight of the polymeric components (a), (b) and (c).

DETAILED DESCRIPTION OF THE INVENTION

Preferably, the at least one crystalline propylene homopolymer or copolymer (a) has a melting enthalpy of at least 75 J/g, preferably of at least 85 J/g. In particular, (a) may be selected from:

(i) isotactic propylene homopolymers with an isotacticity index of at least 80, preferably of at least 90;

(ii) propylene homopolymers obtained by using a metallocene catalyst, having a pentad (mmmm) content of at least 90% (determined by $^{13}$C-NMR analysis);

(iii) crystalline copolymers of propylene with ethylene and/or at least one alpha-olefin having from 4 to 10 carbon atoms, with an overall content of ethylene and/or at least one alpha-olefin not higher than 10% by mole;

(iv) heterophasic propylene copolymers obtained by sequential polymerization of propylene and of mixture of propylene with ethylene and/or at least one alpha-olefin having from 4 to 10 carbon atoms, containing at least 70% by weight of propylene homopolymer or of crystalline propylene/ethylene copolymer, with an isotacticity index greater than 80, the remainder consisting of an elastomeric ethylene/propylene copolymer with a propylene content of from 30 to 70% by weight;

(v) crystalline propylene homopolymers or copolymers having syndiotactic structure obtained by using a metallocene catalyst.

As regards the at least one ethylene copolymer (b), it is generally characterized by a narrow molecular weight distribution, with a Molecular Weight Distribution Index (MWDI), defined as the ratio between the weight-average molecular weight $M_w$ and the number-average molecular weight $M_n$, not higher than 5, preferably from 1.5 and 3.5. The molecular weight distribution index can be determined, according to conventional methods, by Gel Permeation Chromatography (GPC).

With $C_3$-$C_{12}$ alpha-olefin it is meant an olefin of formula $CH_2$=CH—R, wherein R is a linear or branched alkyl having from 1 to 10 carbon atoms. Preferably the alpha-olefin is a $C_4$-$C_8$ alpha-olefin. The alpha-olefin can be selected, for example, from: propylene, 1-butene, 1-pentene, 4-methyl-1-pentene, 1-hexene, 1-octene, 1-dodecene and the like. 1-Hexene and 1-octene are particularly preferred.

Optionally, the at least one ethylene copolymer (b) may further comprise at least one diene comonomer. The at least one diene comonomer generally has from 4 to 20 carbon atoms. Preferably, said diene comonomer is selected from: linear, conjugated or non-conjugated diolefins, for example 1,3-butadiene, 1,4-hexadiene or 1,6-octadiene; monocyclic or polycyclic dienes, for example 1,4cyclohexadiene, 5-ethylidene-2-norbornene, 5-methylene-2 norbornene, and the like.

Preferably, the at least one ethylene copolymer (b) has a melting enthalpy from 30 to 60 J/g.

Preferably, the at least one ethylene copolymer (b) has a Melt Flow Index (MFI), measured according to ASTM standard D 1238/L, of from 0.1 to 30 g/10 min, preferably from 0.5 to 5 g/10 min.

Preferably, the at least one ethylene copolymer (b) has a Composition Distribution Index (CDI) of at least 45%, the CDI being defined as the weight percentage of copolymer molecules with an alpha-olefin content within 50% of the average total molar content of alpha-olefin. The CDI provides a measure of the distribution of the alpha-olefin among the copolymer molecules, and may be determined by means of Temperature Rising Elution Fractionation techniques as described, for example, in U.S. Pat. No. 5,008,204, or in Wild et al., J. Poly. Sci. Poly, Phys., ed., Vol. 20, p. 441 (1982).

Preferably, the at least one ethylene copolymer (b) has the following monomer composition: 75-97% by mole, preferably 90-95% by mole, of ethylene; 3-25% by mole, preferably 5-10% by mole, of the at least one alpha-olefin; 0-5% by mole, preferably 0-2% by mole, of the at least one diene.

The ethylene copolymers (b) can be obtained by copolymerization of ethylene with at least one alpha-olefin, and optionally with at least one diene, in the presence of a "single-site"catalyst, for example a metallocene catalyst, as described, for example, in U.S. Pat. Nos. 5,246,783 and 5,272,236. The metallocenes used in the polymerization of olefins are coordination complexes between a transition metal, usually from group IV, in particular titanium, zirconium or hafnium, and two cyclopentadienyl ligands, which are optionally substituted, used in combination with a co-catalyst, for example an aluminoxane, preferably a methylaluminoxane, or a boron compound (see, for example, J. Organometallic Chemistry, 479 (1994), 1-29, U.S. Pat. Nos. 5,414, 040, 5,229,478, or WO 93/19107, EP 889 091 and EP 632 065). Catalysts that are suitable for obtaining the ethylene copolymer (b) according to the present invention also include the "constrained geometry catalysts" described, for example, in EP 416 815, EP 418 044 and U.S. Pat. No. 5,703,187.

Examples of ethylene copolymers (b) which are currently commercially available include the products Engage® from Dow Chemical and Exact® from Exxon Chemical.

As to the at least one ethylene homopolymer or copolymer (c), it may be selected from: high density polyethylene (HDPE) having a density of at least 0.940 g/cm$^3$, preferably of from 0.940 to 0.960 g/cm$^3$; medium density polyethylene (MDPE) having a density of from 0.926 to 0.940 g/cm$^3$; low density polyethylene (LDPE) and linear low density polyethylene (LLDPE) having a density of from 0.910 to 0.926 g/cm$^3$. Particularly preferred is a linear low density polyethylene (LLDPE) having a density of from 0.910 to 0.926 g/cm$^3$.

The at least one ethylene homopolymer and copolymer (c) may be prepared according to well known techniques. More specifically, HDPE and MDPE may be prepared by a low to medium pressure ethylene homopolymerization in the presence of a Ziegler-Natta catalyst, providing an ethylene homopolymer with a very low branching degree. LDPE is generally produced by a high-pressure process wherein ethylene is homopolymerized in the presence of oxygen or a peroxide as initiator, giving rise to long-branched polyethylene chains. LLDPE is a short-branched copolymer of ethylene with at least one alpha-olefin, generally having from 3 to 12 carbon atoms. LLDPE may be prepared according to known low-pressure processes in the presence of a Ziegler-Natta catalyst or a chromium-based catalyst. In LLDPE, the alpha-olefin is preferably 1-butene, 1-hexene or 1-octene, and is present in the copolymer in an amount of from 1 to 15% by moles.

As to the at least one flame-retardant filler, it may be generally selected from hydroxides, hydrated oxides, hydrated salts of metals, in particular of aluminium or magnesium, such as: magnesium hydroxide, alumina trihydrate, hydrated magnesium carbonate, magnesium carbonate, or mixtures thereof.

Magnesium hydroxide is particularly preferred, since it is characterized by a very high decomposition temperature, of about 340° C., thus allowing high extrusion temperatures to be used. Particularly preferred is magnesium hydroxide of natural origin, obtained by grinding minerals based on magnesium hydroxide, such as brucite or the like, as described in the above cited WO 99/05688.

The at least one flame-retardant filler is generally used in the form of particles which are untreated or surface treated with saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; and the like.

In order to increase the compatibility with the polymer components, the at least one flame-retardant filler can likewise be surface-treated with at least one coupling agent, selected, for example, from organic silanes or titanates such as vinyltriethoxysilane, vinyltriacetylsilane, tetraisopropyl titanate, tetra-n-butyl titanate and the like.

According to a preferred embodiment, the flame-retardant composition according to the present invention further comprises at least one coupling agent. Said coupling agent is preferably added to increase interaction between the active groups of the flame retardant filler and the polymer chains and therefore compatibility between the flame-retardant filler and the polymer components.

The at least one coupling agent can be selected from those known in the art, for example: saturated silane compounds or silane compounds containing at least one ethylenic unsaturation; epoxides containing an ethylenic unsaturation; mono-carboxylic acids or, preferably, dicarboxylic acids having at least one ethylenic unsaturation, or derivatives thereof, in particular anhydrides or esters.

Examples of silane compounds which are suitable for this purpose are: γ-methacryloxypropyl-trimethoxysilane, allyltrimethoxysilane, allyltriethoxysilane, allylmethyldimethoxysilane, allylmethyldiethoxysilane, methyltriethoxysilane, methyltris(2-methoxyethoxy)silane, dimethyldiethoxysilane, vinyltris(2-methoxyethoxy)silane, vinyltrimethoxysilane, vinylmethyldimethoxysilane, vinyltriethoxysilane, octyltriethoxysilane, isobutyltriethoxysilane, isobutyltrimethoxysilane and the like, or mixtures thereof.

Examples of epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether and the like, or mixtures thereof.

Monocarboxylic or dicarboxylic acids, having at least one ethylenic unsaturation, or derivatives thereof, which can be used as coupling agents are, for example: maleic acid, maleic anhydride, fumaric acid, citraconic acid, itaconic acid, acrylic acid, methacrylic acid and the like, and anhydrides or esters derived from these, or mixtures thereof. Maleic anhydride is particularly preferred.

The at least one coupling agent can be used as such or pregrafted onto a polyolefin, for example polyethylene or copolymers of ethylene with an alpha-olefin, by means of a radical reaction (see for example patent EP-530,940). The amount of the at least one coupling agent grafted is generally from 0.05 to 5 parts by weight, preferably from 0.1 to 2 parts by weight, relative to 100 parts by weight of polyolefin. Polyolefins grafted with maleic anhydride are available as commercial products known, for example, under the brand names Fusabond (DuPont), Orevac (Arkema), Exxelor (Exxon Chemical), Yparex (DSM), etc.

Alternatively, the at least one coupling agent of carboxylic or epoxide type mentioned above (for example maleic anhydride) or the silanes with ethylenic unsaturation (for example vinyltrimethoxysilane) may be added to the mixture in combination with a radical initiator so as to graft the at least one coupling agent directly onto the polymer components. An organic peroxide such as tert-butyl perbenzoate, dicumyl peroxide, benzoyl peroxide, ditert-butyl peroxide and the like can, for example, be used as initiator. This method is described, for example, in U.S. Pat. No. 4,317,765, or in the above mentioned WO 99/05688 or WO 00/19452.

The amount of the at least one coupling agent to be added to the flame-retardant composition may vary mainly depending on the type of coupling agent and on the amount of flame-retardant filler, and is generally from 0.01 to 5%, preferably from 0.05 to 2%, by weight relative to the total weight of the polymeric components (a), (b) and (c).

According to a preferred embodiment, the flame-retardant composition according to the present invention may further comprise calcium carbonate. The presence of calcium carbonate, besides giving a certain flame-retardant effect, can further reduce water absorption when the cable is exposed to a humid environment.

Calcium carbonate is generally added in an amount of from 5 to 70%, preferably from 15 to 50%, by weight, relative to the total weight of the polymeric components (a), (b) and (c).

Other conventional components such as antioxidants, processing coadjuvants, lubricants, pigments, other fillers and the like can be added to the flame-retardant composition according to the present invention.

Conventional antioxidants which are suitable for this purpose are, for example: polymerized trimethyldihydroquinoline, 4,4'-thiobis(3-methyl-6-tert-butyl)phenol; pentaerythryltetra-[3-(3,5-di-tert-butyl-4-hydroxyphenyl)propionate], 2,2' thiodiethylene bis[3-(3,5-di-tert-butyl-4-hydroxy-phenyl)propionate] and the like, or mixtures thereof.

Processing co-adjuvants usually added to the polymer base are, for example, calcium stearate, zinc stearate, stearic kid, paraffin wax, silicone rubbers and the like, or mixtures thereof.

The flame retardant composition according to the present invention may further comprise at least one dehydrating agent, as disclosed in WO 00/39810, which is able to absorb the water which may be entrapped in the flame-retardant filler and released during heating caused by the extrusion process. Suitable dehydrating agents are: calcium oxide, calcium chloride, anhydrous alumina, zeolites, magnesium sulphate, magnesium oxide, barium oxide, or mixtures thereof.

The flame-retardant composition according to the present invention is preferably used in a non-crosslinked form, in order to obtain a coating with thermoplastic properties which is thus recyclable.

The flame-retardant composition according to the present invention may be prepared by mixing the polymer components, the at least one flame-retardant filler and the other additives which may be present according to techniques known in the art, for example using an internal mixer of the type containing tangential rotors (Banbury) or interlocking rotors, or in continuous mixers of the Ko-Kneader (Buss) type or of the co-rotating or counter-rotating twin-screw type.

In a preferred embodiment of the invention, the at least one crystalline propylene homopolymer or copolymer (a); the at least one copolymer of ethylene with at least one $C_3$-$C_{12}$ alpha-olefin (b); and the at least one flame-retardant filler (d) are first admixed, for example with one of the techniques described above (internal or continuous mixing) to form a substantially homogeneous blend. Then, during the cable extrusion process, the resulting blend is added with the at least one ethylene homopolymer or copolymer of ethylene with at least one $C_3$-$C_{12}$ alpha-olefin (c).

The flame-retardant composition according to the present invention may be used to coat a conductor directly, or to make an outer sheath on a conductor previously coated with an insulating layer. Moreover, the flame-retardant composition according to the present invention may be used to make the filling material forming a continuous structure having a substantially cylindrical shape around a plurality of conductors. The application of the flame-retardant composition can be carried out, for example, by extrusion. When two layers are present, the extrusion can be carried out in two separate stages, i.e. by extruding the inner layer onto the conductor in a first run and then the outer layer onto this inner layer in a second run. Advantageously, the coating process can be carried out in a single run, for example by means of a "tandem" method, in which two separate extruders arranged in series are used, or alternatively by co-extrusion using a single extrusion head.

BRIEF DESCRIPTION OF THE DRAWINGS

Further details will be illustrated in the following detailed description, with reference to the appended figures, wherein.

For the purposes of the present invention, the term "low-voltage" generally means a voltage of less than 5 kV, preferably less than 2 kV, and even more preferably less than or equal to 1 kV.

Figure 1:
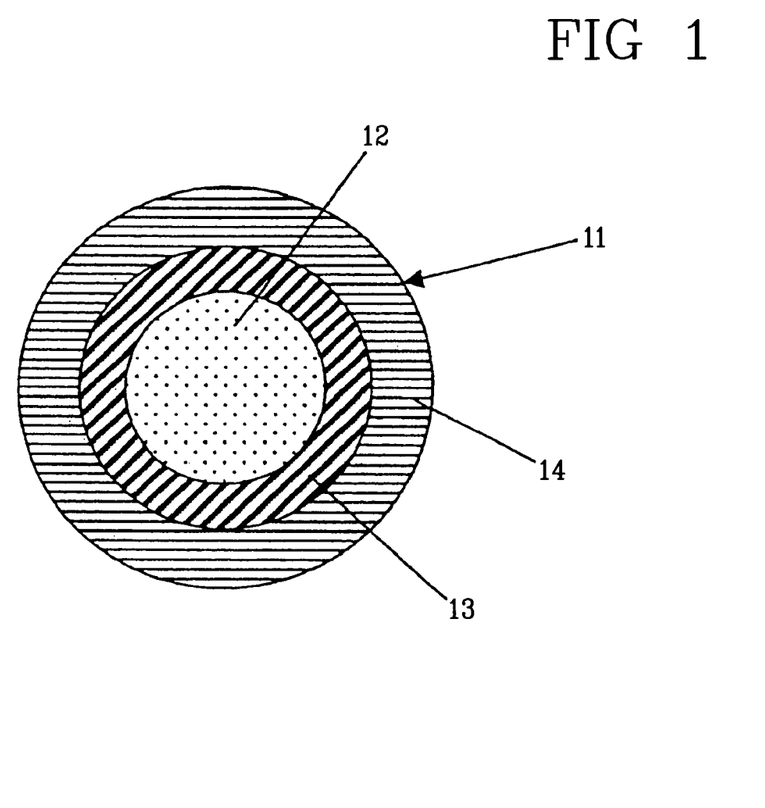
FIG. 1 is a cross-section view of a low-voltage flame-retardant electrical cable of the unipolar type according to a first embodiment.

With reference to FIG. 1, a flame-retardant cable (11) comprises a metal conductor (12), an electrically insulating inner layer (13), and an outer layer (14) made from a flame-retardant composition according to the present invention.

The inner layer (13) can be made of a crosslinked or non-crosslinked, preferably halogen-free, polymer composition, selected, for example, from: polyolefins (homopolymers or copolymers of different olefins), olefin/ethylenically unsaturated ester copolymers, polyesters, polyethers, polyether/polyester copolymers and mixtures thereof. Examples of such polymers are: polyethylene (PE), in particular linear low-density PE (LLDPE); polypropylene (PP); propylene/ethylene thermoplastic copolymers; ethylene-propylene rubbers (EPR) or ethylene-propylene-diene rubbers (EPDM); natural rubbers; butyl rubbers; ethylene/vinyl acetate (EVA) copolymers; ethylene/methyl acrylate (EMA) copolymers; ethylene/ethyl acrylate (EEA) copolymers; ethylene/butyl acrylate (EBA) copolymers; ethylene/alpha-olefin copolymers, and the like. It is also possible to use the same base polymer material for the inner layer (23) as for the outer layer (24).

Figure 2:
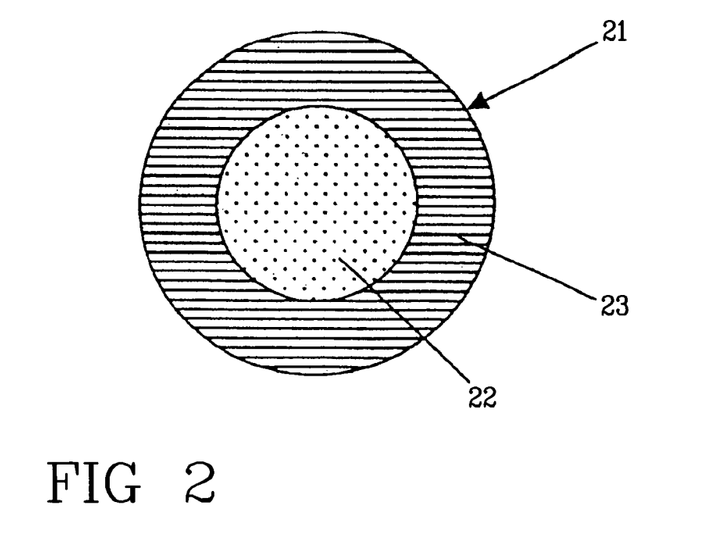
FIG. 2 is a cross-section view of a low-voltage flame-retardant electrical cable of the unipolar type according to a second embodiment.

With reference to FIG. 2, a cable (21) comprises a conductor (22) directly coated with a flame-retardant composition according to the present invention to form an outer layer (23), without interposing any insulating layer. In this case the outer layer (23) also acts as electrical insulation. A thin polymer layer (not shown) acting as an anti-abrasive coating, can also be applied externally to the outer layer (23).

To give an identification coloring to the cable, a pigment can be optionally added to the materials forming the outer layer (23) or to the anti-abrasive coating. Alternatively, a colored thread can be externally applied.

Figure 3:
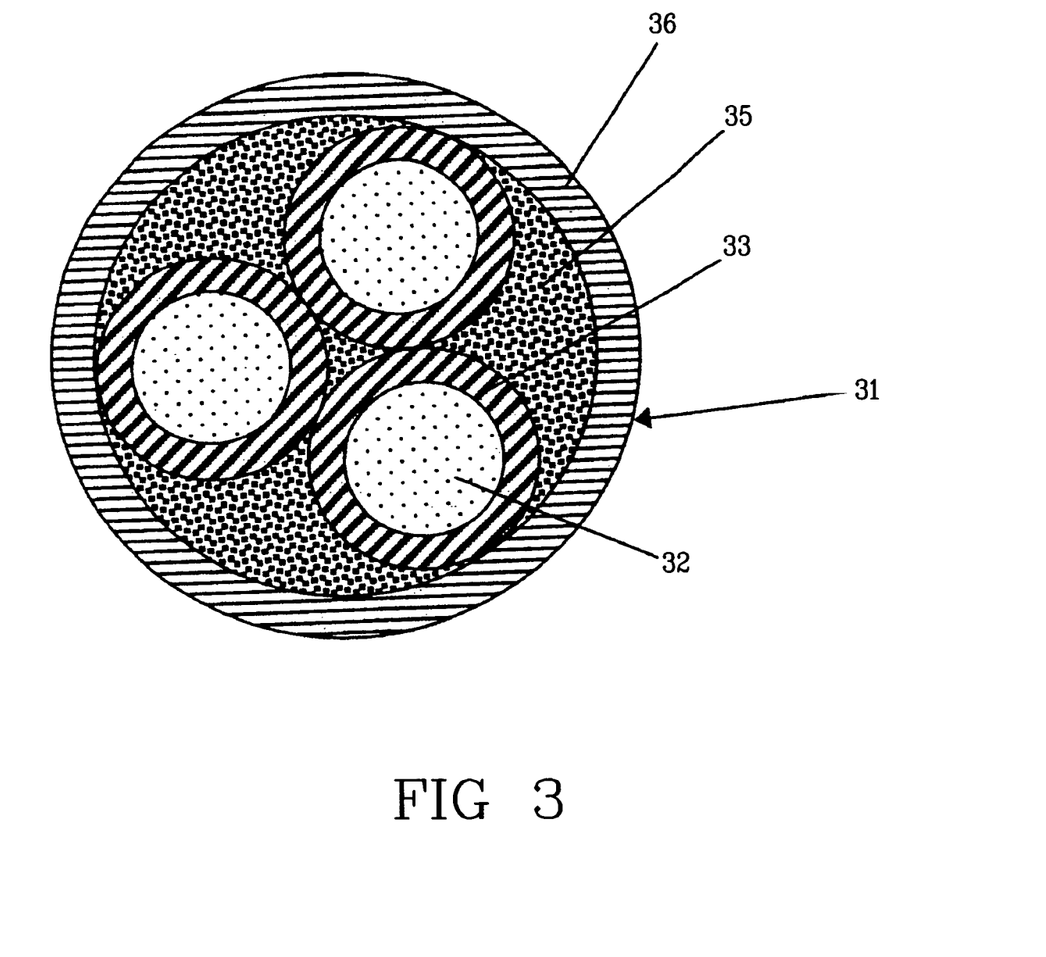
FIG. 3 is a cross-section view of a low-voltage flame-retardant electrical cable of the tripolar type.

With reference to FIG. 3, a cable (31) of the tripolar type comprises three conductors (32), each coated with an insulating layer (33), of which two are phase conductors, the third one is the neutral conductor. The insulating layers (33) can be made of an insulating polymer material as described above, or also of a flame-retardant composition, particularly that according to the present invention. The so insulated conductors (32) are stranded together and the interstices between the insulated conductors (32) are filled with a filling material (35) to form a continuous structure having a substantially cylindrical shape. The filling material (35) is preferably a flame-retardant material, usually a low viscosity, low cost polymer filled with a flame-retardant filler such as those described above. Alternatively, the filling material (35) can be formed by the flame retardant composition according to the invention. On the so obtained structure an external sheath (46) made of the flame-retardant composition according to the present invention is applied, usually by extrusion.

FIGS. 1, 2, and 3 show only some possible embodiments of flame-retardant cables according to the present invention. Suitable modifications can be made to these embodiments, without thereby departing from the scope of the present invention. Particularly, telecommunications cables or data transmission cables, or also combined energy/telecommunications cables, can be produced using the flame-retardant compositions according to the present invention. In addition, although the present description is mainly directed to flame-retardant cables, the flame-retardant compositions according to the invention can be used to impart flame-retardant properties to other articles, in particular to other electrical devices such as electrical cable joints or terminations.

The following working examples are given to better illustrate the invention, but without limiting it.

Preparation of the Flame-Retardant Compositions.

The flame-retardant compositions of the examples reported herein below were prepared in a co-rotating double screw, (150 mm diameter and L/D=45) continuous mixer. The mixing was carried with an output of 1500 Kg/hour, and melt temperature of 230° C.

Preparation of the Flame-retardant Cables.

Cable specimens were obtained by extruding the flame-retardant composition as an external sheathing (referred as 36 in FIG. 3) over a tripolar cable core to reach a final diameter of 10 mm. The extrusion speed applied was as fast as possible, but limited by the need of obtaining an optimal cable surface finishing.

Measurement of Mechanical Properties.

Tensile strength and elongation at break were measured according to CEI EN 60811-1-1 (2001), using the dumbbells obtained from the cable sheathing.

The same measurements of mechanical properties were also performed after thermal ageing, carried out on the same cable specimens after exposure in air oven ageing for 168 hours at 110° C.

Measurement of Flame Resistance.

Cable specimens, prepared as described above for mechanical tests, were subjected to a test for resistance to vertical flame propagation for a single cable, according to CEI EN 50265-2-1 (1999-09), which provides for subjecting a 600 mm cm long sample, placed vertically, to the direct action of a 1 kW Bunsen flame applied for 1 min at an inclination of 45° relative to the sample. The test is passed when the burn length is lower than 425 mm.

Measurement of Thermo-ressure Resistance.

Cable specimens sheathings, prepared as described above for mechanical tests, were subjected to the pressure test at high temperature, according to CEI EN 60811-3-1 (2001-06), at 90° C. for 4 hours and k=0.4. The deformation of the thickness from the flame-retardant coating (expressed as % with respect to the initial thickness) was measured: the test is passed when the deformation is less than 50%.

EXAMPLES 1-5

The flame-retardant compositions as reported in the following Table 1 were prepared and tested as reported above. The amounts are reported as parts by weight with respect to 100 parts by weight of the polymeric components (a), (b) and (c).

TABLE 1

|  | EXAMPLE | | | | |
| --- | --- | --- | --- | --- | --- |
|  | 1 (*) | 2 (*) | 3 (*) | 4 (*) | 5 |
| Engage ® 8003 | 85.00 | 60.00 | 70.00 | 70.00 | 73.00 |
| Moplen ® RP 315 M | 15.00 | — | — | 30.00 | 13.00 |
| Clearflex ® CLB0 | — | 40.00 | 30.00 | — | 14.00 |
| Hydrofy ® G 2.5 | 166.00 | 146.00 | 170.00 | 156.00 | 143.00 |
| Microcarb ® SM | 40.00 | 32.50 | 30.00 | 25.00 | 34.00 |
| Additives | 5.5 | 4.5 | 5.6 | 5.1 | 4.7 |

(*) comparative

Engage ® 8003: ethylene/1-octene copolymer obtained by metallocene catalysis: ethylene/1-octene weight ratio = 82/18 (5.5% by mole of 1-octene); d = 0.885 g/cm$^3$; MFI = 1.0 g/10'; CDI > 70%; $\Delta H_{2m}$ = 55.6 J/g (marketed by Dow Chemical);
Moplen ® RP 315 M: propylene/ethylene random crystalline copolymer: d = 0.900 g/cm$^3$; MFI = 9.0 g/10'; $T_{2m}$ = 154° C.; $\Delta H_{2m}$ = 90.6 J/g (marketed by Basell Polyolefins);
Clearflex ® CLB0: LLDPE obtained by titanium Ziegler-Natta catalysis: d = 0.911 g/cm$^3$; MFI = 2.2 g/10'; $T_{2m}$ = 123° C. (marketed by Polimeri Europa);
Hydrofy ® G 2.5: natural magnesium hydroxide obtained by grinding brucite (marketed by Nuova Sima S.r.l.); $d_{50}$ = 2.9 μm; surface area BET = 7.02 g/cm$^3$.
Microcarb ® SM: calcium carbonate (marketed by Nuova Sima S.r.l.).
Additives: mixture of antioxidants, processing agents and compatibilizers.

The results of the tests as described above are reported in the following Table 2.

TABLE 2

|  | Required values | EXAMPLE | | | | |
|---|---|---|---|---|---|---|
|  |  | 1 (*) | 2 (*) | 3 (*) | 4 (*) | 5 |
| Tensile strength (MPa) | ≥9 | 11 | 10 | 12 | 13.8 | 13.3 |
| Elongation at break (%) | ≥125 | 165 | 175 | 140 | 168 | 184 |
| Tensile strength after ageing (110° C.; 7 days) (MPa) (variation %) | ≥9 (max ± 30%) | 12.5 (+14%) | 12.1 (+21%) | 13.8 (+15%) | 14.4 (+4%) | 15.1 (+14%) |
| Elongation at break after ageing (110° C.; 7 days) (%) (variation %) | ≥100 (max ± 40%) | 143 (−13%) | 150 (−14%) | 115 (−18%) | 88 (−47%) | 145 (−21%) |
| Thermopressure resistance at 90° C. (%) | ≤50 | 100 | 15 | 30 | 17 | 25 |
| Flame resistance | yes/no | yes | yes | yes | yes | yes |
| Extrusion Speed (m/min) |  | 130 | 35 | 45 | 120 | 140 |

(*) comparative

The cable specimen with the comparative composition 4 does not stand the thermal ageing test showing an unacceptable drop in the elongation at break thereafter.

The cable specimen with the comparative composition 1 is totally deformed during the thermo-pressure test.

During the extrusion of cables with the comparative compositions 3 and 4, an acceptable surface finishing could not be obtained with extrusion speed faster that, respectively, 35 and 45 m/min, inadequate for an cost-effective manufacturing.

Composition 5 according to the invention provided the cable with all of the sought mechanical and manufacturing characteristics.

Measurement of Water Absorption.

Cables specimens sheathings, prepared as described above for mechanical tests, were subjected to the gravimetric water absorption test, according to CEI EN 60811-1-3 (2001), at 100° C. for 24 hours.

| Example | Water Absorption % by weight |
|---|---|
| 5 | 0.1 |
| 6* | 4.4 |

*comparative
The cable specimen sheathing 6* is made of a lead-free, Ca/Zn stabilized flame retardant PVC composition.

The invention claimed is:

1. A flame-retardant cable comprising at least one conductor and at least one conductor and at least one coating made from a flame-retardant composition, said composition being a mixture of at least the following components:
   (a) from 5 to 25% by weight of at least one crystalline propylene homopolymer or copolymer;
   (b) from 50 to 90% by weight of at least one copolymer of ethylene with at least one $C_3$-$C_{12}$ alpha-olefin, having a density of from 0.860 to 0.904 g/cm³ and a Molecular Weight Distribution Index not higher than 5;
   (c) from 5 to 30% by weight of at least one ethylene homopolymer or copolymer of ethylene with at least one $C_3$-$C_{12}$ alpha-olefin having a density of from 0.905 to 0.970 g/cm³; and
   (d) from 80 to 300% by weight at least one halogen-free flame-retardant filler selected from hydroxides, hydrated oxides, and hydrated salts of metals, the percentage being based on the total on the weight of the polymeric components (a), (b) and (c).

2. The flame-retardant cable according to claim 1, wherein the flame retardant composition comprises:
   from 10 to 20% by weight of the at least one crystalline propylene homopolymer or copolymer (a);
   from 65 to 80% by weight of the at least one copolymer of ethylene (b); and
   from 10 to 20% by weight of at least one ethylene homopolymer or copolymer (c),
   the percentages being abased on the total weight of the polymeric components (a), (b) and (c).

3. The flame-retardant cable according to claim 1, wherein the at least one flame-retardant filler is present in an amount of from 120 to 250%, the percentages being based on the total weight of the polymeric components (a), (b) and (c).

4. The flame-retardant cable according to claim 1, wherein the at least one crystalline propylene homopolymer or copolymer (a) has a melting enthalpy of at least 75 J/g.

5. The flame-retardant cable according to claim 1, wherein the at least one ethylene copolymer (b) has a Molecular Weight Distribution Index from 1.5 and 3.5.

6. The flame-retardant cable according to claim 1, wherein the $C_3$-$C_{12}$ alpha-olefins in the at least one copolymer of ethylene (b) and in the at least one copolymer of ethylene (c), equal or different from each other, are selected from: propylene, 1-butene, 1-pentene, 4-methyl-1pentene, 1-hexene, 1-octene, and 1-dodecene.

7. The flame-retardant cable according to claim 1, wherein the at least one ethylene copolymer (b) further comprises at least one diene comonomer.

8. The flame-retardant cable according to claim 1, wherein the at least one ethylene copolymer (b) has the following monomer composition: 75-97% by mole of ethylene; 3-25% by mole of the at least one alpha-olefin; and 0-5% by mole of the at least one diene.

9. The flame-retardant cable according to claim 1, wherein the at least one ethylene homopolymer or copolymer (c) is selected from: high density polyethylene having a density of at least 0.940 g/cm³; high density polyethylene having a density of from 0.940 to 0.960 g/cm³; medium density polyethylene having a density of from 0.926 to 0.940 g/cm³; and low density polyethylene and linear low density polyethylene having a density of from 0.910 to 0.926 g/cm³.

10. The flame-retardant cable according to claim 1, wherein the at least one flame-retardant filler is magnesium hydroxide.

11. The flame-retardant cable according to claim 10, wherein the at least one flame-retardant filler is natural magnesium hydroxide.

12. The flame-retardant cable according to claim 1, wherein the flame-retardant composition further comprises at least one coupling agent.

13. The flame-retardant cable according to claim 1, wherein the flame-retardant composition further comprises calcium carbonate.

14. The flame-retardant cable according to claim 13, wherein calcium carbonate is added in an amount of from 5 to 70% by weight, relative to the total weight of the polymeric components (a), (b) and (c).

15. The flame-retardant cable according to claim 14, wherein calcium carbonate is added in an amount of from 15 to 50% by weight, relative to the total weight of the polymeric components (a), (b) and (c).

16. The flame-retardant cable according to claim 1, wherein the flame-retardant composition is non-crosslinked.

17. A flame-retardant composition comprising:
(a) from 5 to 20% by weight of at least one crystalline propylene homopolymer or copolymer;
(b) from 50 to 90% by weight of at least one copolymer of ethylene with at least one $C_3$-$C_{12}$ alpha-olefin, having a density of from 0.860 to 0.904 $g/cm^3$ and a Molecular Weight Distribution Index not higher than 5;
(c) from 5 to 30% by weight of at least one ethylene homopolymer or copolymer of ethylene with at least one $C_3$-$C_{12}$ alpha-olefin having a density of from 0.905 to 0.970 $g/cm^3$; and
(d) from 80 to 300% by weight of at least one halogen-free flame-retardant filler selected from hydroxides, hydrated oxides, and hydrated salts of metals,
the percentage being based on the total weight of the polymeric componets (a),(b) and (c).

* * * * *